United States Patent [19]
Brugerolle

[11] Patent Number: 4,579,566
[45] Date of Patent: Apr. 1, 1986

[54] PROCESS AND APPARATUS FOR PRODUCING A GAS OF HIGH PURITY BY VAPORIZATION OF A CRYOGENIC LIQUID

[75] Inventor: Jean-Renaud Brugerolle, Paris, France

[73] Assignee: L'Air Liquide, Societe Anonyme pour l'Etude et l'Exploitation des Procedes Georges Claude, Paris, France

[21] Appl. No.: 584,392

[22] Filed: Feb. 28, 1984

[30] Foreign Application Priority Data
Mar. 8, 1983 [FR] France .................. 83 03758

[51] Int. Cl.$^4$ .............................................. B68B 1/00
[52] U.S. Cl. ............................................ 55/50; 55/269; 62/11; 62/22; 62/31; 62/34; 62/42; 422/305
[58] Field of Search ............... 261/DIG. 65; 122/5; 422/305; 62/34, 36, 42, 31, 22, 9, 11; 55/23, 25, 27, 50, 80, 267-269

[56] References Cited

U.S. PATENT DOCUMENTS
- 2,208,661 7/1940 Christensen .
- 2,760,351 8/1956 Schilling ................ 62/34
- 2,972,235 2/1961 Smith .

FOREIGN PATENT DOCUMENTS
- 2120475 8/1972 France .
- 142477 10/1921 United Kingdom .

Primary Examiner—Frank Sever
Attorney, Agent, or Firm—Young & Thompson

[57] ABSTRACT

The reservoir 1 contains in its lower part a purifying vessel 2 which contains a plate 9 having a bell means communicating with the reservoir and provided with an overflow pipe 12 through which liquid overflows into a bath having a constant level. When gas is drawn off from the top of the purifying vessel, liquid taken from the lower bath is vaporized in an exterior vaporizer 3 and the gas produced passes through the two baths in succession. In this way it is possible to obtain the gases having high purity devoid of particles of dust which are required for certain applications and in particular in the electronic component industry.

11 Claims, 1 Drawing Figure

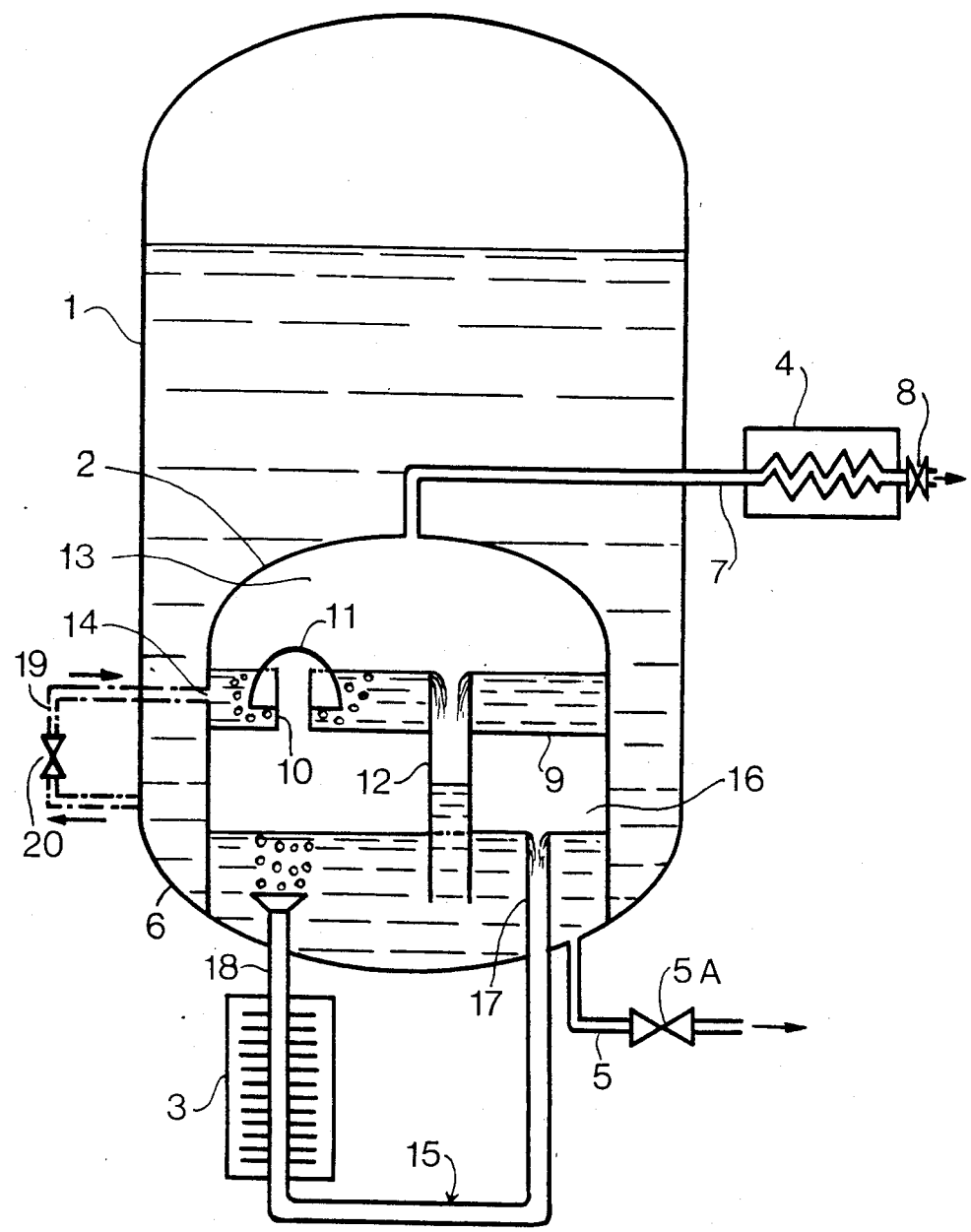

PROCESS AND APPARATUS FOR PRODUCING A GAS OF HIGH PURITY BY VAPORIZATION OF A CRYOGENIC LIQUID

The present invention relates to a process for producing a gas of high purity by vaporization of a cryogenic liquid contained in a reservoir of the type in which there is washed by means of said liquid the gas produced by vaporization of this liquid.

Cases such as nitrogen, oxygen, argon or hydrogen are frequently distributed by producers in the liquid form at very low temperature and stored by the users in reservoirs termed evaporators. When gate is required, liquid is drawn off from the evaporator, vaporized by a vaporizer and then heated so as to be distributed in the gaseous state at a substantially constant pressure.

The processes of the aforementioned type (see for example French patent No. 2,120,475) in addition purify the gas produced. By distillation.

In some applications such as the semi-conductor industry, a very high purity of the gases is required and in particular a practically complete absence of dust which cannot be obtained with the known processes.

Indeed, when, as is the case in the aforementioned French patent, the gas produced by heating is merely bubbled in the liquid contained in the evaporator, the particles of dust in suspension accumulate in a large number close to the surface of the liquid and are deposited on the wall of the reservoir; when the level drops, the drying of the walls due to the entry of heat causes the solid particles to be once again entrained by the gas drawn off.

An object of the invention is to provide a process for obtaining permanently and as required the gas which is substantially devoid of dust.

The invention therefore provides a process of the aforementioned type, wherein said gas is caused to pass through a bath of liquid of constant level contained in an auxiliary vessel supplied with liquid by the reservoir.

In order to be able to continue the drawing off of pure gas for a longer period, the auxiliary vessel is preferably drained when a predetermined quantity of gas has been drawn off. In this way, the liquid through which the gas travels does not receive an excessive concentration of solid particles.

In a preferred manner of carrying out the invention, said level is maintained constant by supplying fresh liquid to a compartment of the auxiliary vessel which contains said bath and by causing said bath to overflow into a second compartment which has a constant level and is contained in the auxiliary vessel, said draining being effected in this second compartment. This very effectively eliminates particles of dust which accumulate on the surface of the washing liquid.

Another object of the invention is to provide an apparatus for carrying out a process such as that defined hereinbefore.

In this device, which is of the type comprising a cryogenic liquid reservoir, a vaporizer and a mass of liquid interposed between the vaporizer and a pipe for drawing off the gas, said mass of liquid is a bath having a constant level contained in an auxiliary vessel and supplied with liquid by the reservoir.

It is very advantageous to dispose the auxiliary vessel inside the reservoir. Indeed, the apparatus is then particularly cheap to construct and, moveover, the liquid of the reservoir thermally insulates the auxiliary vessel and avoids the drying of the latter, even after prolonged periods of inactivity.

An embodiment of the invention will now be described with reference to the accompanying drawing in which the single FIGURE shows diagrammatically in longitudinal section an apparatus for producing gas of high purity according to the invention.

The apparatus shown in the drawing comprises mainly a storage reservoir or evaporator 1, an auxiliary vessel or purifier 2, contained in the reservoir, a vaporizer 3, a heater 4, and at least one draining pipe 5.

The vessel 2 has the shape of a bell welded by its base to the lower end 6 of the reservoir. Extending from the top of the bell is a pipe 7 for drawing off gas which extends through the heater 4 outside the reservoir 1 and is provided with a valve 8.

The vessel 2 is divided into two compartments by a plate 9 which has at least one riser pipe 10; the latter is covered by a fixed ball 11 whose lower edge is located below the upper edge of the pipe 10. The plate 9 also comprises at least one down pipe 12 formed by a vertical tube which extends between the vicinity of the lower wall 6 of the reservoir and a level located above the lower edge of the bell 11 and below the upper end of the pipe 10. The upper compartment 13 of the vessel 2 communicates with the space of the reservoir 1 outside the vessel through at least one opening 14 provided in the wall of the vessel slightly above the plate 9 and below the level of the overflow edge of the pipe 12.

A U-shaped tube 15 extends by its two vertical branches into the lower compartment 16 of the vessel 2 by passing through the lower wall 6. One branch 17 of this tube extends upwardly to a level higher than the level of the lower end of the down pipe 12. The other branch 18 of the tube 15 extends through the vaporizer 3 outside the vessel 2 and then extends into the vessel through the lower wall 16 to a level lower than the level of the upper end of the branch 17.

The draining pipe 5 extends from the lower wall 16 inside the vessel 2 and is provided with a valve 5A.

This apparatus operates in the following manner:

The reservoir 1 is filled with a cryogenic liquid. The valves 8 and 5A are closed and the compartments 13 and 16 contain liquid up to the level of the top of the tube 12 and the top of the branch 17 of the tube 15 respectively.

When the user opens the valve 8 and draws off the gas, he reduces the pressure in the upper compartment 13. In order to reestablish the hydrostatic equilibrium, liquid enters this compartment through the opening 14 and overflows into the tube 12 and then into the tube 17. Liquid thus enters the vaporizer 3 and is re-introduced in the gaseous form in the compartment 16 through the branch 18 of the tube 15.

This gas increases the pressure in the compartment 16 and this urges back liquid, on one hand, upwardly in the tube 12 and, on the other hand, downwardly out of the bell 11. As soon as the liquid has descended in the bell to the level of its lower edge, bubbles are caused to escape into the upper bath and these bubbles replace the gas drawn off through the pipe 7. This series of phenomena, illustrated in full line in the drawing, continues so long as gas is drawn off. When the valve 8 is closed, the equilibrium is reestablished as soon as the pressure prevailing in the upper compartment 13 is in equilibrium with that prevailing in the reservoir 1. Then, progressively, as the vessel 2 is isothermic, the pressures become substantially equal in the compartments 13 and 16 and the apparatus resumes its initial state.

In the course of the drawing off of the gas, it can be seen that the gas comes from the vaporization of the liquid of the lower bath and that it passes first of all through this bath, then through the upper bath and thus undergoes two washings. These washings eliminate, on one hand, the less volatile dissolved impurities by a distillation effect, and, on the other hand, the particles of dust and the other solid impurities which adhere to the liquid by capillarity.

The lower bath is progressively charged with particles of dust. When a given quantity of gas has been drawn off, this bath is drained by opening valve 5A so that the bath is renewed with fresh liquid entering the opening 14.

Remaining particles of dust are removed from the gas pre-washed by the lower bath, by the upper bath. The latter is not charged with dust since it is constantly renewed through the opening 14 and the particles of dust which accumulate on its surface are eliminated by the overflow pipe 12. Consequently, a gas of high purity reaches the drawing-off pipe 7.

Consequently, if a filter is disposed in the drawing-off pipe 7 as a safety measure, this filter becomes clogged only very slowly, which limits correspondingly the introduction of impurities in the circuit owing to filter changes.

The fact that vessel 2 is disposed in the lower bath of the reservoir 1 is very advantageous. On one hand, the construction of the whole of the apparatus is simple and, on the other hand, the liquid of the reservoir which surrounds the whole of the bell 2 maintains the purifying vessel perfectly isothermic regardless of the entries of heat in the reservoir. Consequently, even after a prolonged period of inactivity, the two baths of the vessel 2 are not liable to dry out and the operation of the apparatus is reliable irrespective of the drawing off flow.

Note that in the event of overpressure in the compartment 13, there is produced a condensation of the purified gas on the upper dome of the vessel 2 which washes the latter.

Many modifications of the described apparatus may be contemplated:

- as illustrated in dot-dash lines, the upper bath may be supplied with liquid through a pipe 19 outside the reservoir and communicating at one end with the compartment 13 a little above the plate 9 and at the other end with the liquid outside the vessel 2. This pate 19 is provided with a cock 20 for regulating the flow through the pipe;
- the flow of liquid through the vaporizer 3 may be controlled by a pressure regulator disposed in the tube 15, in the branch 17 of the latter extending from the lower wall 6 of the vessel 2. In this case, the level of the lower bath is maintained constant by a level regulator controlling the cock 20;
- the vessel 2 may contain a plurality of superimposed washing plates similar to the plate 9, in which case the upper plate is supplied with fresh liquid and each plate has an overflow supplying liquid to the immediately lower plate. At least one of the lower plates may moreover be replaced by an appliance through which the liquid travels downwardly and the gas travels upwardly. In each configuration, the first washing by bubbling may be eliminated, the branch 18 of the tube 15 being then extended up to above the level of the lower bath;
- a plurality of purifying vessels 2 may be provided in the same reservoir which permits fully draining one thereof without interrupting the operation of the apparatus. The same result could moreover be achieved with a single vessel 2 by partitioning the lower compartment 16;
- the vaporization of the liquid contained in the lower bath may be achieved by means other than those described hereinbefore, for example by those described in the aforementioned French patent No. 2,120,475;
- the fixed bell of the plate 9 may be replaced by a vertically freely movable valve member which defines a section of passage for the purified gas which is proportional to the drawn-off flow of gas. In this case, the overflow pipe 12 must of course extend above the upper end of the pipe 10. Any other plate which constrains the rising gas to pass through a liquid bath could also be suitable.

What is claimed is:

1. A process for obtaining a substantially dust-free gas from a dust-containing cryogenic liquid stored in a reservoir, the process comprising precluding the presence of dust in a vaporized gas by:

providing an auxiliary vessel having a constantlevel compartment;

supplying said liquid from said reservoir to said compartment, whereby a constant level bath is formed in said compartment;

vaporizing a desired quantity of said liquid, whereby the liquid level in the reservoir drops;

washing the gas produced by said vaporizing step by passing the same through said constant-level bath; and drawing off said substantially dust-free gas from an upper portion of said compartment.

2. A process according to claim 1, and draining the auxiliary vessel when a predetermined quantity of gas has been drawn off.

3. A process according to claim 2, and causing said bath to overflow into a second constant-level compartment contained in the auxiliary vessel to form a second constantlevel bath in said second compartment, said draining being effected from said second compartment.

4. A process according to claim 3, and withdrawing said desired quantity of liquid from said second compartment.

5. A process according to claim 4, and passing the gas produced by said vaporizing step firstly through said bath in said second compartment and then through the firstmentioned bath.

6. An apparatus for producing a substantially dust-free gas by vaporizing a dust-containing cryogenic liquid, said apparatus comprising means designed for precluding the presence of dust in a vaporized gas, comprising a reservoir for the cryogenic liquid, a vaporizer, a pipe for drawing off the gas, an auxiliary vessel containing a bath of constant level which comprises a body of liquid interposed between said vaporizer and said drawing-off pipe, and means for supplying liquid to said auxiliary vessel from said reservoir, thereby progressively reducing the level of the liquid in said reservoir.

7. An apparatus according to claim 6, wherein said auxiliary vessel comprises at least one draining pipe for draining from said auxiliary vessel, when a predetermined quantity of gas has been drawn off, cryogenic liquid in which dust has accumulated.

8. An apparatus according to claim 7, wherein said auxiliary vessel has a first compartment, a second compartment and means for maintaining liquid at a constant level in said second compartment, said first compartment containing said bath and comprising an overflow which supplies liquid to said second compartment, said second compartment having said draining pipe.

9. An apparatus according to claim 8, wherein said vaporizer comprises means generating gas in the liquid contained in said second compartment, and said first comparment is separated from said second compartment by a plate having gas bubbling means.

10. An apparatus according to claim 9, wherein said gas bubbling means comprise bubbling bell means.

11. An apparatus according to claim 6, wherein said auxiliary vessel is disposed inside said reservoir.

* * * * *